United States Patent
Ogasawara

(10) Patent No.: US 8,078,674 B2
(45) Date of Patent: Dec. 13, 2011

(54) SERVER DEVICE OPERATING IN RESPONSE TO RECEIVED REQUEST

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 12/114,877

(22) Filed: May 5, 2008

(65) Prior Publication Data
US 2008/0281906 A1 Nov. 13, 2008

(51) Int. Cl.
*G06F 15/16* (2006.01)
(52) U.S. Cl. .......................... 709/203; 709/227; 718/105
(58) Field of Classification Search .................... 709/203
See application file for complete search history.

(56) References Cited

U.S. PATENT DOCUMENTS

| | | | | |
|---|---|---|---|---|
| 5,838,910 A * | 11/1998 | Domenikos et al. | ......... | 709/203 |
| 6,240,442 B1 * | 5/2001 | Domenikos et al. | ......... | 709/203 |
| 7,237,242 B2 | 6/2007 | Blythe et al. | | |
| 7,448,049 B1 * | 11/2008 | Xing | ............... | 719/318 |
| 7,587,510 B1 * | 9/2009 | Klager et al. | ................ | 709/232 |
| 7,703,084 B2 * | 4/2010 | Lindhorst et al. | ............. | 717/136 |
| 7,769,931 B1 * | 8/2010 | Angelone et al. | ............... | 710/74 |
| 2002/0055982 A1 * | 5/2002 | Goddard | ...................... | 709/217 |
| 2003/0041118 A1 * | 2/2003 | Elnozahy et al. | ............. | 709/218 |
| 2003/0156547 A1 * | 8/2003 | Peleg | ............................ | 370/412 |
| 2003/0187995 A1 * | 10/2003 | Fok et al. | ........................ | 709/227 |
| 2005/0076162 A1 * | 4/2005 | Tamura et al. | .................. | 710/20 |
| 2005/0240941 A1 * | 10/2005 | Hufferd et al. | ................ | 719/321 |
| 2005/0246427 A1 * | 11/2005 | Ishii | ............................. | 709/213 |
| 2006/0136930 A1 * | 6/2006 | Kaler et al. | .................... | 718/105 |
| 2006/0271674 A1 * | 11/2006 | Harada | ......................... | 709/224 |
| 2006/0294234 A1 * | 12/2006 | Bakke et al. | ................. | 709/225 |
| 2007/0083649 A1 * | 4/2007 | Zuzga et al. | .................. | 709/224 |
| 2007/0094529 A1 * | 4/2007 | Lango et al. | ...................... | 714/4 |
| 2007/0112966 A1 * | 5/2007 | Eftis et al. | ...................... | 709/227 |
| 2007/0244905 A1 * | 10/2007 | Ito et al. | ........................... | 707/10 |
| 2008/0133739 A1 * | 6/2008 | Zuzga et al. | .................. | 709/224 |
| 2008/0172679 A1 * | 7/2008 | Shen et al. | .................... | 719/318 |
| 2008/0281906 A1 * | 11/2008 | Ogasawara | ................... | 709/203 |
| 2009/0077233 A1 * | 3/2009 | Kurebayashi et al. | ........ | 709/224 |
| 2009/0094611 A1 * | 4/2009 | Danne et al. | ................. | 718/105 |

FOREIGN PATENT DOCUMENTS

| | | |
|---|---|---|
| JP | 05-020100 | 1/1993 |
| KR | 10-0586283 | 6/2006 |

OTHER PUBLICATIONS

Eiji Kawai, et al., The Design of a Piling I/O Mechanism with Real-time Signals, Information Processing Society of Japan, vol. 46, Mar. 15, 2005. Motohiko Matsuda, et al., "The Design and Implementation of Asynchronous Communication Mechanism for MPI . . . ", Information Processing Society of Japan, vol. 45, Oct. 25, 2004.
"http://e-words.jp/w/Winsock.html (retrieved on Apr. 18, 2007)" for Winsock.).

* cited by examiner

*Primary Examiner* — Firmin Backer
*Assistant Examiner* — Hamza Algibhah
(74) *Attorney, Agent, or Firm* — Vazken Alexanian

(57) ABSTRACT

A server device, methods and a computer program product operating in response to a request received from a client. A request storage device in system memory space with a request storage region stores a request received from a client in association with identification information. An identification information storage region contains a request that is waiting to be processed. An identification information storage unit retrieves at least one request waiting to be processed from the request storage region if the number of identification information pieces stored in the identification information storage region has declined to a reference number or below, and then stores retrieved request identification information in the identification information storage region Multiple request processors operate in parallel, each acquiring identification information from the identification information storage region, a request identified by the acquired identification information from the request storage region, and performing processing in response to the acquired request.

20 Claims, 12 Drawing Sheets

SERVER DEVICE OPERATING IN RESPONSE TO RECEIVED REQUEST

CROSS-REFERENCE TO RELATED APPLICATIONS

This application claims priority under 35 U.S.C. 119 from Japanese Patent Application No. 2007-125505 filed May 10, 2007, the entire contents of which are incorporated herein by reference.

BACKGROUND OF THE INVENTION

The present invention relates to a server device which operates in response to a received request. In particular, the present invention relates to a server device in which multiple processors operate in parallel in response to multiple received requests.

As businesses utilizing web servers have become increasingly active in recent years, the web servers are required to have highly-sophisticated and complex functions. For example, there is a case where a web server receives a large number of requests in parallel simultaneously. In order to effectively respond to these requests, a large-scale web server is configured with multiple CPUs, thereby operating multiple threads in parallel on an operating system by allocating each of the multiple requests to each of the respective threads.

An effective way for effectively processing a request in a web server is to shorten waiting time (hereafter referred to as idle time) between a time when a thread completes the process for a request and a time when the thread initiates the process for the next request, or to eliminate the idle time altogether. In order to achieve such an effective process, each thread may simply retrieve a request which has been received but unprocessed upon completion of the process of the previous request. However, if each of the multiple threads independently retrieves a request in such a way, the efficiency may become low.

To be more precise, in the case where not only a web server but also any server device each communicates with a client device based on TCP/IP protocol or the like, an interface known as a socket interface is often used. For example, a socket interface developed for a BSD UNIX operating system and a Winsock interface of a Windows operating system are well-known (refer to home page URL "http://e-words.jp/w/Winsock.html (retrieved on 18 Apr. 2007)" for Winsock.)

For this socket interface, a request received from a client device is stored in system memory space by the functions of an operating system and a device driver, in association with identification information called a file descriptor. When a thread attempts to retrieve a request which has been received but unprocessed, the thread has to scan this system memory space to read out a request corresponding to each of the file descriptors and to determine whether or not the request is a received-but-unprocessed request.

Since this retrieval requires access to the system memory space, it is often necessary to invoke a system call. In addition, when each thread independently performs this retrieval, a problem may arise, for example, where one request is allocated to multiple threads. Hence, it is preferable that exclusive control be performed among threads for this retrieval (this exclusive control is also performed as a system call function in many cases). For this reason, when each thread independently performs such retrieval, processing requires a longer period of time. Hence, such retrieval may lead to even worse overall performance for a web server.

In contrast, the time required for processing system calls can be shortened in a way so that only a certain thread performs such retrieval for allocating requests to other threads. However, such processing with the certain thread is not primary processing performed by the web server in response to requests. Hence, if the retrieval processing is frequently performed excessively, the overall processing performance of the web server may be rather deteriorated. On the other hand, if the operating frequency of this certain thread is set to be excessively low, idle time may be increased. This is because, even if requests have been received, the certain thread cannot promptly allocate the received requests to other threads.

BRIEF SUMMARY OF THE INVENTION

An object of the present invention is to provide a server device, a method, and a program with which the above-described problems are solved. The object is achieved by combining technical features described in independent claims in the scope of claims. In addition, dependent claims define further advantageous embodiments.

In order to solve the above-described problems, an aspect of the present invention provides a server device operating upon receiving a request from a client device, a method for processing requests by using the server device, and a program causing a computer to function as the server device. The server device is provided with a storage device, an identification information storage unit, and multiple request processors. The storage device includes in a system memory space a request storage region in which the request received from the client device is stored in association with identification information of the received request, and in user memory system an identification information storage region in which identification information of a request waiting to be processed is stored. The identification information storage unit retrieves at least one request waiting to be processed from the request storage region on the condition that the number of identification information pieces has declined to a predetermined reference number or below, and then stores identification information in the identification information storage region. Each of the multiple request processors operates in parallel, acquires from the request storage region a request identified by the identification information on the condition that identification information has been acquired from the identification information storage region, and performs processing in response to the acquired request.

Furthermore, the brief description of the present invention dose not list all the necessary features required for the present invention, and sub combinations of these features can also be included in the present invention.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

The present invention will be described below by referring to the following embodiment of the invention. However, the following embodiment of the present invention does not limit the invention in accordance with the scope of claims, and all combinations of the features described in the embodiment are not always necessary for solving means of the invention.

Figure 1:
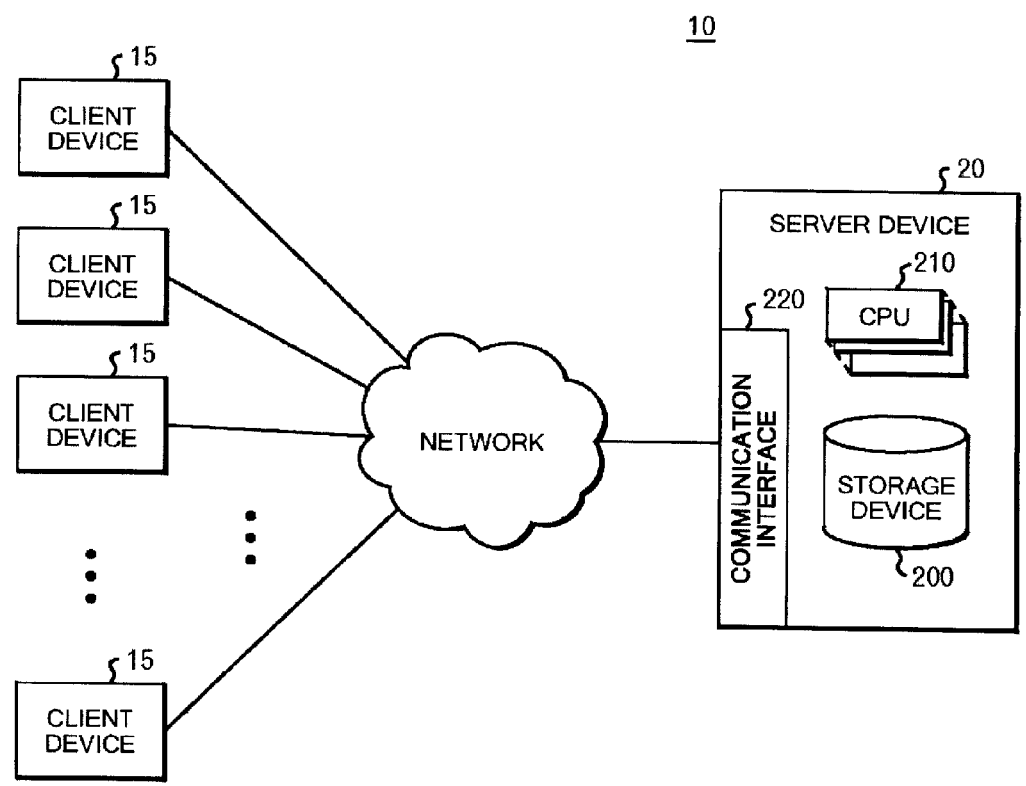
FIG. 1 shows an overall configuration of an information system 10.

FIG. 1 shows a general configuration of an information system 10. The information system 10 includes multiple client devices 15 and a server device 20. Each of the multiple client devices 15 is connected to the server device 20 through a communication network and transmits a request to the server device 20 in accordance with an instruction made by a user of the client device or the like. When the server device 20 is a web server, this request is, for example, an HTTP request. Then, the server device 20 performs processing in response to the request, and as a result of the processing, for example, creates a new web page and sends a reply with the web page included in an HTTP response to the client device 15.

The server device 20, which is provided by a computer, has a storage device 200, at least one CPU 210, and a communication interface 220 as at least one part of its hardware configuration. The storage device 200 stores a program and data, which are necessary for causing the computer to function as the server device 20. At least one CPU 210 loads the program and the data to perform information processing. The communication interface 220 performs communications with multiple client devices 15 according to an instruction made by the CPU 210, which performs an operation based on the program.

An object of the server device 20, according to the present embodiment, is to effectively process a large number of requests, even if they are received in parallel simultaneously, by effectively utilizing the processing performance of the CPU 210.

Figure 2:
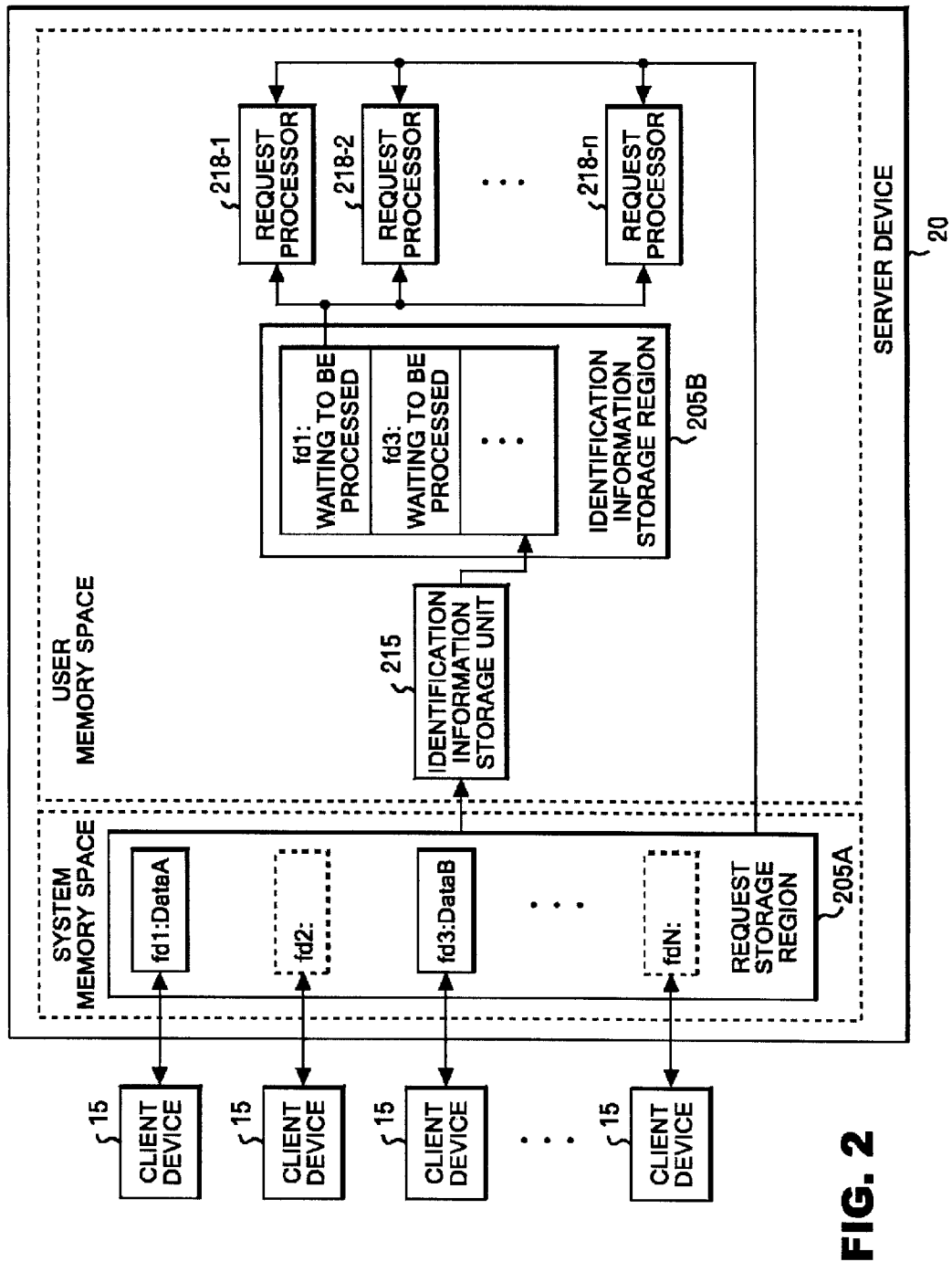
FIG. 2 shows a first schematic configuration example of a server device 20 according to the present embodiment.

FIG. 2 shows a first schematic configuration example of the server device 20 according to the present embodiment. The server device 20 has a request storage region 205A in system memory space of the storage device 200 and an identification information storage region 205B in user memory space of the storage device 200. The system memory space is a memory region under the control of an operating system or various kinds of device drivers. In order to access the system memory space, invoking a predetermined system call, which is provided by the operating system or the like, is usually required. This is because the data stored in the system memory space are closely associated with operations of the hardware or the operating system. Therefore, if a user program is permitted free access, operation of the server device 20 would be interfered with.

The request storage region 205A stores requests received from the client devices 15 in association with identification information of the received requests. As an example, a request indicates the contents of processing requested by the client device 15 to the server device 20. For example, such a request includes a location of a service program for performing the requested processing and a parameter given thereto. The location of the service program is called an URL (Uniform Resource Locator), which includes, for example, a path name, a file name, an extension, or the like. When the server device 20 receives requests from the client devices 15, the operating system and the device driver for communication store the requests sequentially in the request storage region 205A. The number of requests to be stored varies depending on the size of a web site which is operated by the server device. The number sometimes ranges from a few thousand to tens of millions.

Identification information pieces corresponding to the requests are information pieces for identifying connections to receive the requests and the corresponding responses thereof. As an example, in the case where TCP/IP connection is established by using a socket interface, this identification information is called a file descriptor, which is used at the time when a user program processes a request or returns a response. In the drawings, these files descriptors are indicated by codes, such as fd1, fd2, fd3, . . . , and fdN. When a connection has been established, but a request has not arrived yet (e.g. when processing on a client device 15 side has not been finished, or when the server device 20 is processing the previous request), only a file descriptor is stored in the request storage region 205A. The request corresponding to the file descriptor is not stored.

On the other hand, the user memory space is an accessible memory region which does not require a user program to invoke a system call. The identification information storage region 205B is provided in this user memory space to store identification information of requests waiting to be processed. The identification information storage region 205B implements a queue of FIFO (First In First Out), which stores identification information stored by an identification information storage unit 215 at the end of the queue and provides identification information from the head of the queue to request processors 218-1 to 218-n. The requests waiting to be processed are the ones which have been received by the server device 20 and have not been processed by request processors 218, which will be described below. Hence, when a file descriptor has been stored in the request storage region 205A but the request corresponding to the file descriptor has not been stored yet, the identification information storage region 205B does not store the file descriptor. Meanwhile, the identification information storage region 205B does not store identification information of a request which has been once stored in the identification information storage region 205B, has been acquired by any one of the request processors 218, and has already been put in process.

The server 20 includes the identification information storage unit 215 and the request processors 218-1 to 218-n, which are configured to operate under the control of at least one CPU 210. The brief description of a method for operating the identification information storage unit 215 and the request processors 218-1 to 218-*n* is as follows. The operating system operates multiple threads which are the main bodies of executing the operating system, and the threads operate as if they are CPUs from a viewpoint of a programmer or a user. The thread is actually a program counter for sequentially executing programs, a stack pointer for recording positions in the storage device 200 in which the program stores data in process, a register for storing data in process by the program, and a storage region prepared exclusively for the program in the user memory space.

The operating system allocates each of the multiple CPUs 210 to each of the threads and causes each thread to actually execute the program. While the program is waiting for completion of processing by a relatively low-speed input/output device or completion of a predetermined operation by other threads, the operating system allocates the CPU, which has been allocated to the thread, to another thread so as to prevent the capacity of the CPU from being wasted while waiting for completion of processing, therefore utilizing the CPU effectively. Hence, a thread is an executing body which virtualizes a CPU operation for effectively utilizing CPUs in the case where the numbers of CPUs and the number of programs operating in parallel simultaneously are different and for effectively utilizing a waiting time for completion of input and output operations.

In this manner, to allocate a CPU with a thread waiting to be processed to another thread is referred to as thread blocking or a thread blocking operation. Specifically, for example, thread blocking is completed by storing values of the program counter, stack pointer, and register of another thread in the program counter, stack pointer, and register of a CPU after values of the program counter, stack pointer, and register of the CPU are saved in a predetermined storage region corresponding to the threads waiting to be processed. Although thread blocking can be quickly processed by an operating system, it takes a certain amount of time for processing. Hence, processing efficiency can be increased with a fewer number of blockings.

The identification information storage unit 215 and the request processors 218-1 to 218-*n* according to the present embodiment are respectively operated by the multiple of threads that are different from each other. In other words, the operating system operates CPUs 210 by allocating them individually to each of the identification information storage unit 215 and the request processors 218-1 to 218-*n*. If there are multiple CPUs 210, they operate in parallel. In addition, in the case where the number of the CPUs 210 is less than the total number of the identification information storage unit 215 and the request processors 218-1 to 218-*n* (it happens in many cases when there is an attempt to utilize the processing capacity of the CPU 210 as much as possible), if a certain thread operates too frequently, it may interfere with operations of other threads.

Next, the description will be given of functions of the identification information storage unit 215 and the request processors 218-1 to 218-*n*, which are achieved as described above. The identification information storage unit 215 retrieves at least one request waiting to be processed from the request storage region 205A, and stores identification information of the retrieved request in the identification information storage region 205B. In the example of FIG. 2, the file descriptors fd1 and fd2 are retrieved and stored in the identification information storage region 205B. It is preferable that the identification information storage unit 215 issue a system call for retrieving at least one up to the predetermined upper limit number of requests from the request storage region 205A at once, and store identification information obtained as a result thereof in the identification information storage region 205B. As an example, this system call is a pollset system call of the socket interface. With this, higher processing efficiency can be achieved than when requests are retrieved one by one.

The request processors 218-1 to 218-*n* operate in parallel. They can operate in this way, as described above, only when the number of the CPUs 210 is at least two and is sufficiently large. Then, each of the request processors 218-1 to 218-*n* attempts to acquire identification information from the head of the identification information storage region 205B implementing a FIFO queue. In order to prevent one request from being redundantly processed by multiple request processors 218, exclusive control is required for acquiring this identification information. However, since the exclusive control targets the storage region in the user memory space, it is unnecessary to issue a system call, and therefore the exclusive control is processed at an extremely high-speed. For example, it is operated by an instruction sequence which is a numerical instruction including a command called "compare_and_swap" and is executable at a few cycles up to dozens of cycles depending on the CPU. Thus, it can be processed at an extremely higher speed than the issuance of a system call can be.

In a case where an exclusive right is acquired in the exclusive control and the identification information storage region 205B is not empty (that is, at least one piece of identification information is stored, and the following is the same as above), acquisition of identification information is successively completed. Note that acquisition is used to describe the action to make target information be unavailable for further retrieval after retrieving the target information (for example, to erase), and will be used distinctively from the term "readout" or the like. On condition that identification information has been acquired, each of the request processors 218-1 to 218-*n* acquires from the request storage region 205A a request identified by the identification information. It is required, for acquiring a request, to make an access to the system memory space. Thus, in many cases, issuance of a system call is necessary. However, since it is guaranteed that a request processor can exclusively acquire a request upon acquiring identification information thereof, there is no such case where a thread is blocked because a request cannot be acquired in this system call.

Then, each of the request processors 218-1 to 218-*n* performs processing in response to the acquired request. For example, upon being operated by a Java program which is created in advance so as to perform processing in response to a request, the request processors 218-1 to 218-*n* perform processing in response to a request by causing the Java program to be executed by a Java virtual machine. If needed, each of the request processors 218-1 to 218-*n* returns a response, for example, in a form of a HTTP response by adding a processing result to a new web page, to the client device 15. Since the response process is also a communication based on TCP/IP, the file descriptor is used.

As described above, in the first configuration example described by referring to FIG. 2, by storing identification information for identification of a request waiting to be processed in the user memory space, and by occasionally updating the stored request with a single thread, a number of threads operating the request processors 218-1 to 218-*n* compete with each another to access to the system memory is avoided. As a result, the possibility of thread blocking is reduced, and the number or frequency of issuing a system call is reduced. Thus, it is possible to improve the utilization ratio of CPU 210 which was originally intended to be used for processing.

However, if the identification information storage unit 215 operates too frequently, the CPU 210 is used up so much for the operation that there is a possibility of disturbing the performance of the request processor 218, which conducts the originally-intended processing in accordance to a request. On the other hand, in the case where the operation frequency of the identification information storage unit 215 is excessively low, even if the request storage region 205A stores a request waiting to be processed, identification information thereof is not stored in the identification information storage region 205B. Hence, there is a possibility of increased request processor 218 idle time or of frequent thread blocking (referred to as a worker thread), which operates the request processor 218. In contrast, in a second configuration example described below, by having the identification information storage unit 215 operate at a suitable frequency depending on the situation, it becomes possible not only to prevent the identification information storage region 205B from becoming empty without interfering with the originally-intended processing by the identification information storage unit 215, but also to prevent the processing of adjusting frequency from disturbing the originally-intended processing in response to a request as much as possible.

Figure 3:
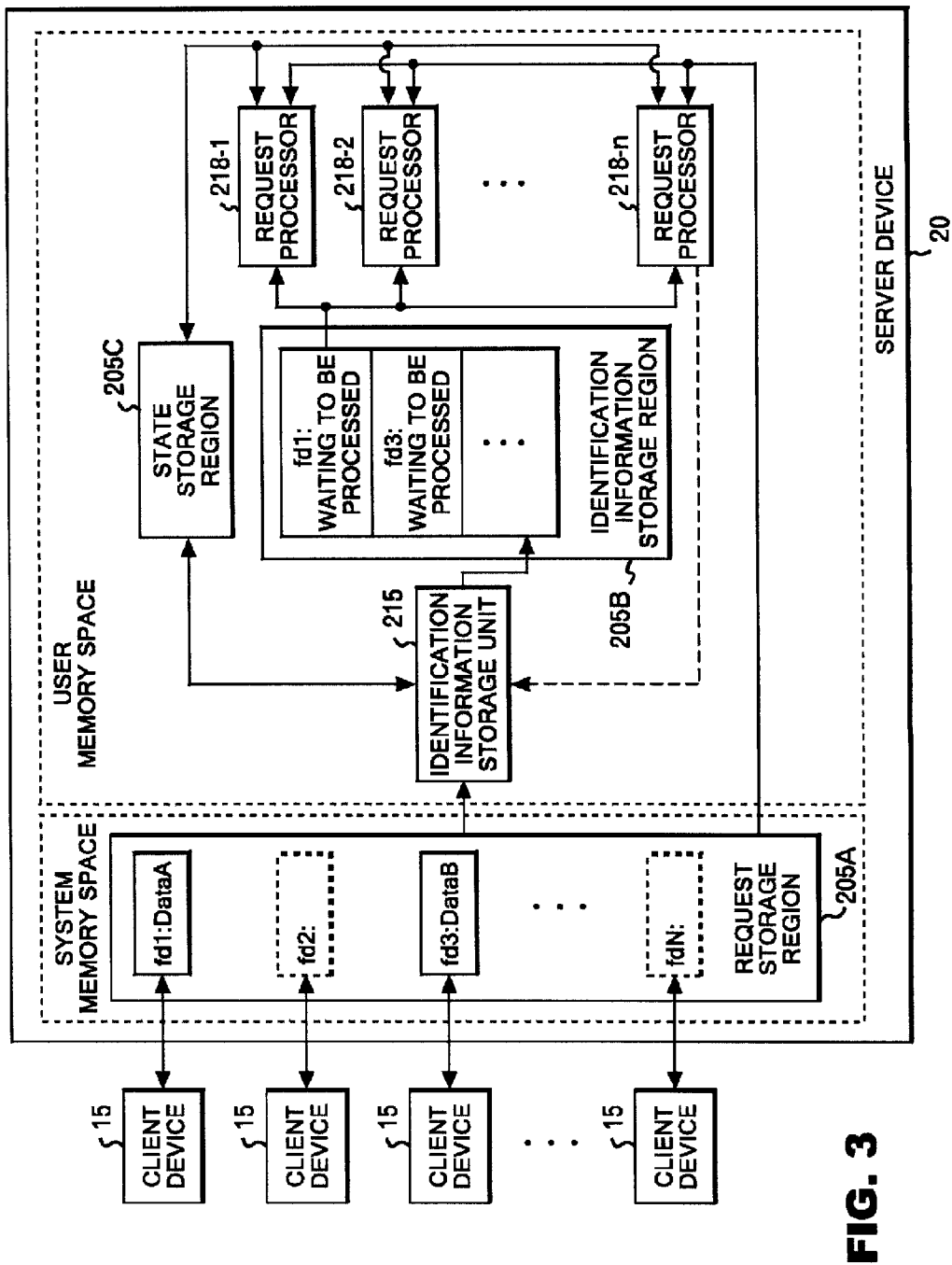
FIG. 3 shows a second schematic configuration example of a server device 20 according to the present embodiment.

FIG. 3 shows a second schematic configuration example of a server device 20 according to the present embodiment. Some of the constituents of the server device 20 in FIG. 3 include a request storage region 205A, an identification information storage region 205B, an identification information storage unit 215, and request processors 218-1 to 218-n, the processing functions, and an operating method that is the same as the one in the first configuration example described in FIG. 2. Thus, the description thereof will be omitted except for some differences between the configuration examples. On the other hand, the server device 20 in the second configuration example described in FIG. 3 includes a state storage region 205C in the user memory space of the server device 20 in addition to the server device 20 shown in the first configuration example described in FIG. 1.

The state storage region 205C is provided to store the state of the identification information storage region 205B. The state depends on at least one of the numbers of identification information pieces that the identification information storage unit 215 has stored in the identification information storage region 205B and of the identification information pieces that the request processors 218-1 to 218-n has acquired from the identification information storage region 205B. In accordance with the acquisition of the identification information from the identification information storage region 205B by the process described above, at least one request processor 218 (here, for example, it is set to be the request processor 218-n, but it may also be any of the request processors 218) updates the state stored in the state storage region 205C based on the acquired number of identification information pieces and determines whether or not an instruction to initiate an operation should be given to the identification information storage unit 215.

Specifically, the request processor 218-n first determines whether or not the number of identification information pieces stored in the identification information storage region 205B has declined to a predetermined reference number or below as a result of acquiring identification information from the identification information storage region 205B. This determination may be performed in such a manner so that the identification information storage region 205B is counted by scanning the number of identification information pieces. However, the determination can be performed more rapidly by accessing the state storage region 205C and by referring to the counter which counts the number of identification information pieces in the identification information storage region 205B. Then, the request processor 218-n instructs the identification information storage unit 215 to initiate an operation when the number of identification information pieces has declined to a reference number or below. In addition, along with this processing, similar to the above-described request processor 218, the request processor 218-n acquires a request identified by the acquired identification information and performs processing in response to the acquired request.

The identification information storage unit 215 initiates an operation upon receiving an instruction from any one of the request processors 218 (for example, the request processor 218-n). Hence, when an operation is immediately initiated, predetermined conditions are fulfilled, such as the condition that the number of identification information pieces stored in the identification information storage region 205B has declined to a reference number or below. Then, the identification information storage unit 215 retrieves at least one request waiting to be processed from the request storage region 205A and sequentially stores these identification information pieces at the end of the FIFO queue of the identification information storage region 205B. After that, in response to the newly storing identification information in the identification information storage region 205B, the identification information storage unit 215 updates the state stored in the identification information storage region 205B based on the number of the newly-stored identification information pieces.

According to the second configuration example described above by referring to FIG. 3, when the number of identification information pieces in the identification information storage region 205B has declined to a reference number or below, becomes nearly empty and before becoming empty, the identification information storage unit 215 can be filled with identification information by causing the identification information storage region 205B to operate. Hence, the idle time of a worker thread operating the request processors 218-1 to 218-n or the number of worker thread blocking can be reduced. In addition, by determining the operation initiation of the identification information storage unit 215 based on the state of the identification information storage region 205B, the overall originally-intended processing performance of the server device 20 can be improved because the identification information storage unit 215 does not operate at all if all request processors 218-1 to 218-n are occupied in processing. Furthermore, determination on the operation initiation of the identification information storage unit 215 is performed only when the request processor 218 is ready to initiate a new request processing. The determination is carried out in the process of the initiation of the request processor 218. Hence, the amount of CPU 210 resources required for adjusting the operation frequency of the identification information storage unit 215 can also be minimized. It is also possible to further improve the processing efficiency by setting a reference number in a certain way. Setting a reference number and a suitable method thereof for updating the state storage region 205C will be described below by referring to FIG. 4.

Figure 4:
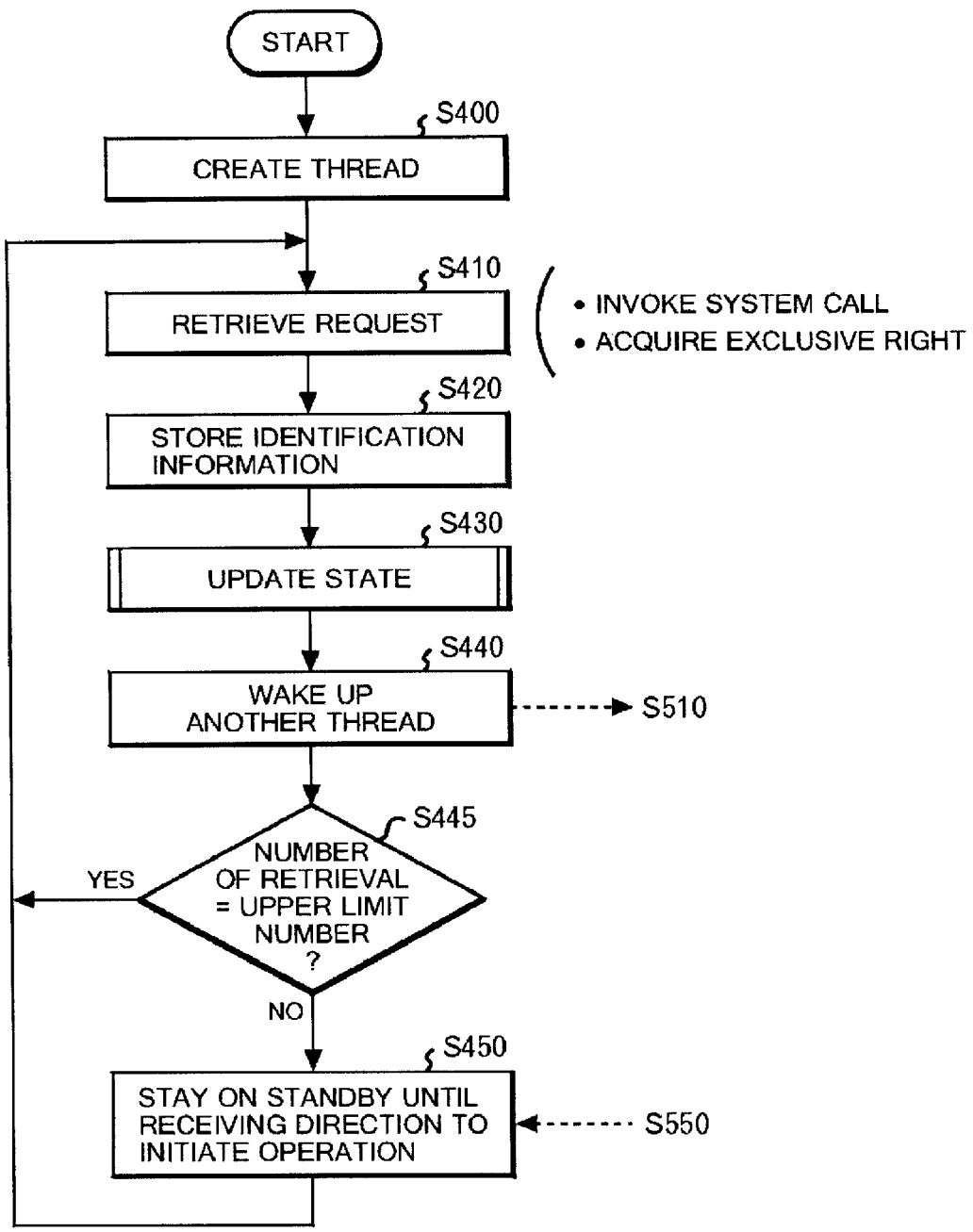
FIG. 4 is a flowchart showing an operation of an identification information storage unit 215 according to the present embodiment.

FIG. 4 is a flowchart showing an operation of the identification information storage unit 215 according to the present embodiment. Upon being initiated or reset, the server device 20 creates a thread for operating the identification information storage unit 215 (S400). The identification information storage unit 215 initiates an operation when a thread is created as described above or when the identification information storage unit 215 receives an instruction to initiate an operation, as described later as S450, and then the identification information storage unit 215 retrieves at least one request waiting to be processed from the request storage region 205A (S410). This process is achieved with the issuance of a system call by adding the upper limit number of requests to be retrieved (strictly speaking, a packet size of data in which a request is embodied) as an argument to an argument of the above-described pollset system call. In addition, if the identification information storage unit 215 is operated by a Java program, a JNI (Java Native Interface) is adopted upon the issuance of a system call. In many cases, it is necessary to acquire an exclusive access right for full or partial access to the request storage region 205A. With this, for a single instruction to initiate an operation or a single creation of the first thread, multiple identification information pieces, up to the upper limit number, is collectively retrieved.

After that, the identification information storage unit 215 sequentially stores the identification information of the retrieved request to the end of the FIFO queue of the identification information storage region 205B (S420). For this storing process, it is also necessary to acquire an exclusive access right to the identification information storage region 205B. Since the request processors 218 access the head of the identification information storage region 205B, and, conversely, the identification information storage unit 215 accesses the end thereof, acquisition of the exclusive access right can be successfully completed in many cases. In addition, since the exclusive access right is for access to the user memory space, the processing thereof can also be completed extremely rapidly. After that, in response to the fact that identification information has been newly stored in the identification information storage region 205B, the identification information storage unit 215 updates the state stored in the state storage region 205C based on the number of the identification information pieces newly stored (S430).

Next, the identification information storage unit 215 wakes up another thread which has been in a state of waiting for receiving a request (S440). For example, in spite of the control according to the present embodiment, it is possible to have a situation where the identification information storage region 205B has become empty, and another worker thread is blocking (for example, S510 to be described later). Therefore, the identification information storage unit 215 attempts to detect such a blocking worker thread and wakes up the worker thread upon detecting the thread. As will be described later by referring to FIG. 5, the awakened-worker thread attempts to acquire a request and then performs processing in response to the acquired request.

Next, the identification information storage unit 215 determines whether or not the number of the retrieved identification information pieces is equal to the above-described predetermined upper limit number (S445). This upper limit number is much smaller than the number of connections between the server device 20 and the client devices 15. The number may be as low as in a range of a several dozen. This is due to constraints in system call overheads required for retrieving a request, such as the storage capacity of the identification information storage region 205B, and the time required for initialization and serialization. When the upper limit number equals the number of identification information pieces, there may be a request which is waiting to be processed and has not been retrieved. Hence, the identification information storage unit 215 goes back to S410 and immediately retrieves the request based on condition that the number of identification information pieces equals the upper limit number (S445: YES).

On the other hand, if the number of retrieved identification information pieces is below the upper limit number (S445: NO), the identification information storage unit 215 stays on standby until an instruction to initiate an operation is received from a worker thread, which in this case is anyone of the request processors 218-1 to 218-*n* (S450). This instruction is issued in processing that will be described in S550. In addition, it is preferable that the identification information storage unit 215 performs processing to return control of the CPU 210, which has been allocated to the thread operating the identification information storage unit 215, to the operating system in order to allocate control to another thread before or at the same time of going into standby. The detailed description of the processing will be omitted because it is known as a function of the present-day operating system.

Figure 5:
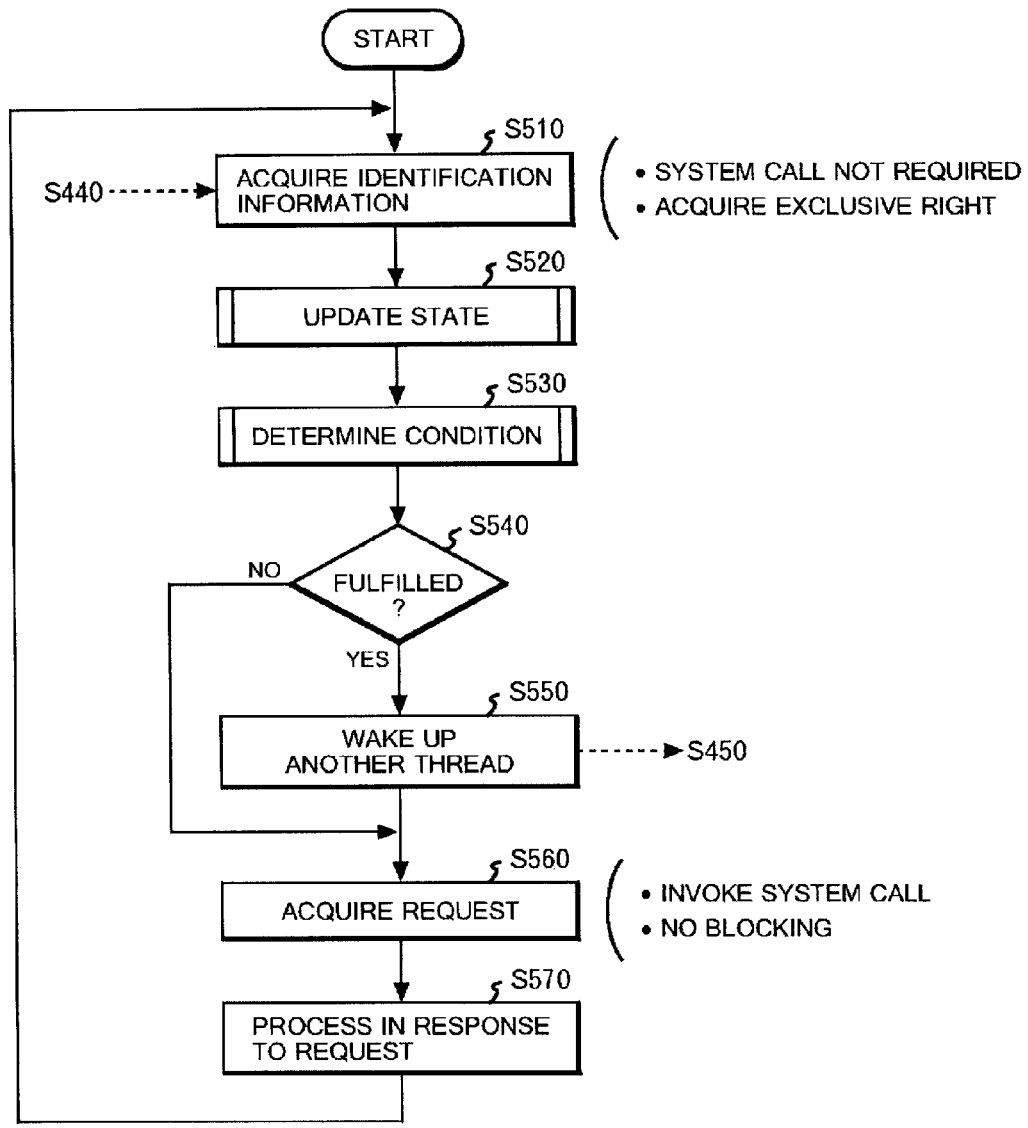
FIG. 5 is a flowchart showing an operation of a request processor 218-1 according to the present embodiment.

FIG. 5 is a flowchart showing an operation of the request processor 218-1 according to the present embodiment. Each of the request processors 218-1 to 218-*n* operates substantially similar to the request processor 218-1. As an example, an operation of the request processor 218-1 will be described below. The request processor 218-1 initiates an operation on allocation of a thread selected thereto from a thread pool. The thread pool is a group of threads which have been created in advance at the initiation and reset of the server device 20. It is possible that an operating system or middleware creates such a thread pool in advance and uses a part of the thread pool to execute a program for operating the request processor 218 accordingly. Instead of going through such a process, an alternative process may be adopted in which the request processor 218-1 may immediately initiate an operation with initiation or reset of the server device 20 and continue working thereafter. In other words, the operation to be described in reference to FIG. 5 shows an operation by the request processor 218-1 by the worker thread operating the request processor 218-1 regardless of how the worker thread operating the request processor 218-1 is initiated.

Upon initiating an operation, the request processor 218-1 first attempts to acquire identification information from the identification information storage region 205B according to the above-described processing without acquiring an exclusive access right to the request storage region 205A (S510). Since the information identification storage region 205B is provided in the user memory space, it is not necessary to issue a system call. However, it is sometimes necessary to acquire an exclusive access right to the information identification storage region 205B. As described above, this acquisition processing can be completed extremely rapidly. If the acquisition of identification information has failed ("to have fail" may indicate a case where a single attempt of acquiring identification information has failed or a case where a predetermined number of attempts of acquiring identification information continuously have failed), the request processor 218-1 stays on standby until a request waiting to be processed is newly received. The standby mode is terminated at S440 in FIG. 4.

Next, the request processor 218-1 updates the state stored in the state storage region 205C based on the number of the acquired identification information pieces (S520). In the case where a request is acquired and processed by the request processor 218-1, the number of identification information pieces is one. Then, the request processor 218-1 determines whether or not to instruct the identification information storage unit 215 to initiate an operation (S530). If the condition is fulfilled (S540: YES), the request processor 218-1 instructs the identification information storage unit 215 to initiate the operation (S550). This instruction is for the above-mentioned standby mode at S450. After acquiring the identification information, the request processor 218-1 then acquires a request identified by the acquired identification information from the request storage region 205A (S560). In order to acquire the request, the request processor 218-1 acquires an exclusive right to a region inside the request storage region 205A, which stores the request identified by the acquired identification information.

For acquisition of a request, it is necessary to access the system memory space. Therefore, issuance of a system call is required in many cases. However, since it is guaranteed that the request processor can exclusively acquire a request upon acquiring identification information thereof, there is no such a case where a thread is blocked because a request cannot be acquired in this system call. For this reason, the request processor 218-1 may issue a special system call which is capable of operating at high speed by omitting the thread blocking function. Thread blocking is a function, for example, to determine whether or not a request to be acquired has been already in a standby mode for processing. If it is not in a standby mode, the thread is blocked. If it is in standby mode, to the function attempts to acquire an exclusive right to access the storage region in which the request to be acquired is stored. If the attempt has failed, the thread is blocked. Then, the request processor 218-1 performs processing in response to the acquired request (S570). After completion of the processing, the request processor 218-1 immediately goes back to S510 and makes another attempt to acquire identification information.

Figure 6:
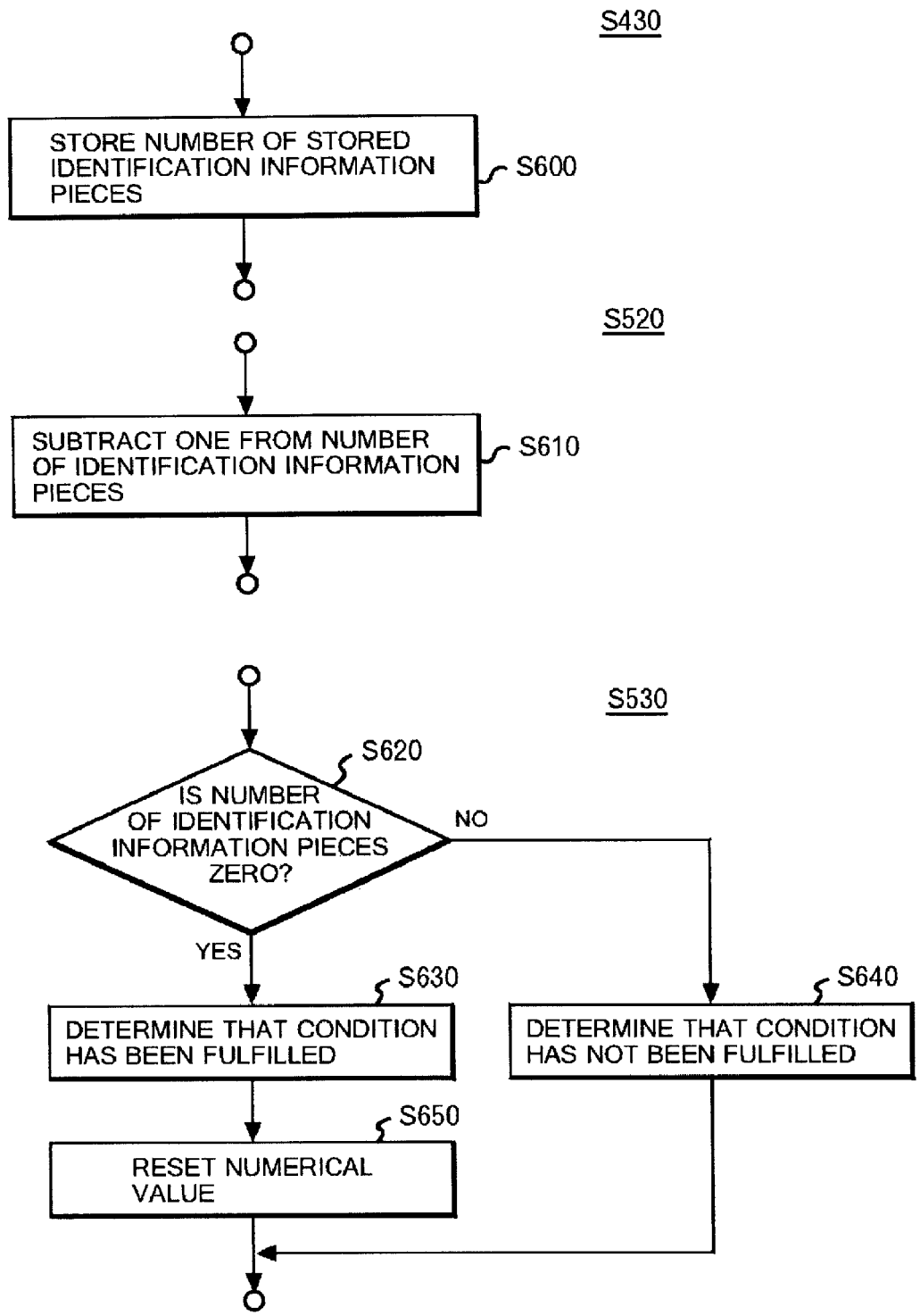
FIG. 6 shows details of operations at S430, S520, and S530.

FIG. 6 shows details of operations at S430, S520, and S530. At S430, in particular, the identification information storage unit 215 stores in the state storage region 205C the number of identification information pieces that are newly stored in the identification information storage region 205B (S600). At S520, in particular, the request processor 218-1 subtracts one from the number of identification information pieces stored at S600. Then, at S530, in particular, the request processor 218-1 determines whether or not the number of identification information pieces stored in the state storage region 205C is zero (S620). With these actions, it is determined whether or not the total number of identification information pieces acquired from the identification information storage region 205B has reached the number of identification information pieces stored in the identification information storage region 205B in the previous time since the previous time when the identification information storage unit 215 stored identification information in the identification information storage region 205B.

If the number of identification information pieces is zero (S620: YES), the request processor 218-1 determines that the condition has been fulfilled (S630), and resets the number of identification information pieces stored in the state storage region 205C to an initial value (S650). The above-described predetermined reference number in this case is the number of identification information pieces in the identification information storage region 205B immediately before the previous time when the identification information storage unit 215 stored identification information in the identification information storage region 205B. In contrast, if the number of identification information pieces is not zero (S620: NO), the request processor 218-1 determines that the condition has not been fulfilled (S640).

As described above, in the example in reference to FIG. 6, by causing the identification information storage unit 215 to operate after the number of identification information pieces acquired this time has reached the number of identification information pieces stored in the previous time, it becomes possible to achieve a stable shift of the number of identification information pieces in the identification information storage region 205B regardless of an uneven distribution of request-dependent throughput, and avoid allowing the identification information storage region 205B to become empty.

Operation timing of the identification information storage unit 215 may be determined based on other references. Modifications in which other references are adopted will be individually described in the following section.

Figure 7:
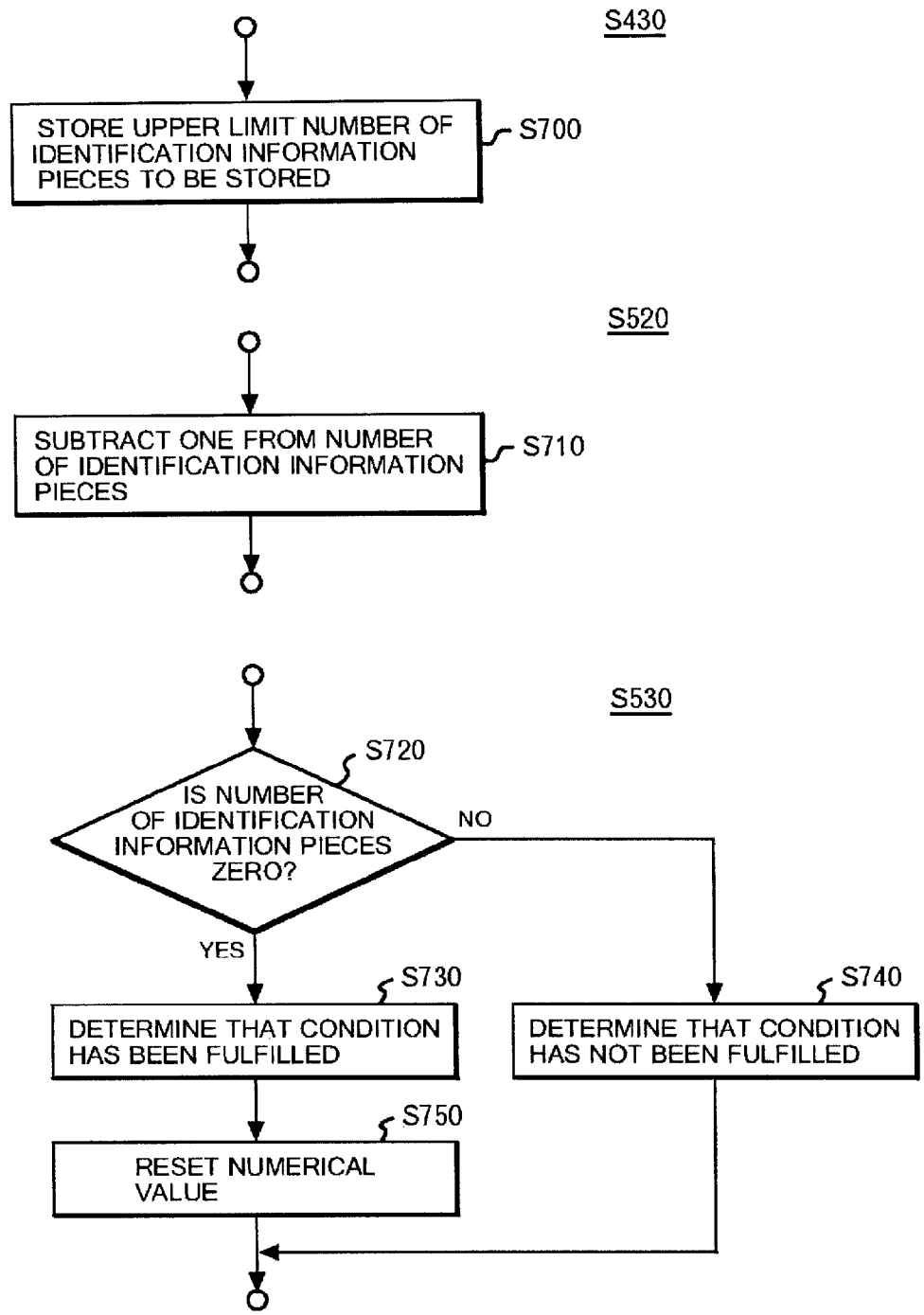
FIG. 7 shows details of operations at S430, S520 and S530 according to a first modification of the present embodiment.

FIG. 7 shows details of the operations at S430, S520, and S530 in a first modification of the present invention. At S430, in particular, the identification information storage unit 215 stores in the state storage region 205C the upper limit number of requests designated for retrieval of the requests in response to the fact that identification information has been newly stored in the identification information storage region 205B (S700). At S520, in particular, the request processor 218-1 subtracts one from the upper limit number of identification information pieces which are stored at S600. Then, at S530, in particular, the request processor 218-1 determines whether or not the number of identification information stored in the state storage region 205C is zero (S720). With these actions, it is determined whether or not the total number of identification information pieces acquired from the identification information storage region 205B has reached the above-described upper limit number since the previous time when the identification information storage unit 215 stored identification information in the identification information storage region 205B.

If the number of identification information pieces is zero (S720: YES), the request processor 218-1 determines that the condition has been fulfilled (S730) and resets the number of identification information pieces stored in the state storage region 205C to an initial value (S750). In contrast, if the number of identification information pieces is not zero (S720: NO), the request processor 218-1 determines that the condition has not been fulfilled (S740).

As described above, in the first modification, since it is only required that a fixed number, which is the upper limit number, instead of a variable, which is the number of identification information pieces newly stored, is stored at S700, the updating processing at S430 can be simplified. In addition, by using a fixed number for the number to be stored, it is obvious for those skilled in the art to be able to achieve further efficiency upon utilizing the characteristics of a fixed number. For example, efficiency may be increased by storing a fixed number in S700 at the time of reset at S750 based on a prediction that a fixed number is to be stored and, at the same time, by omitting S700.

Figure 8A:
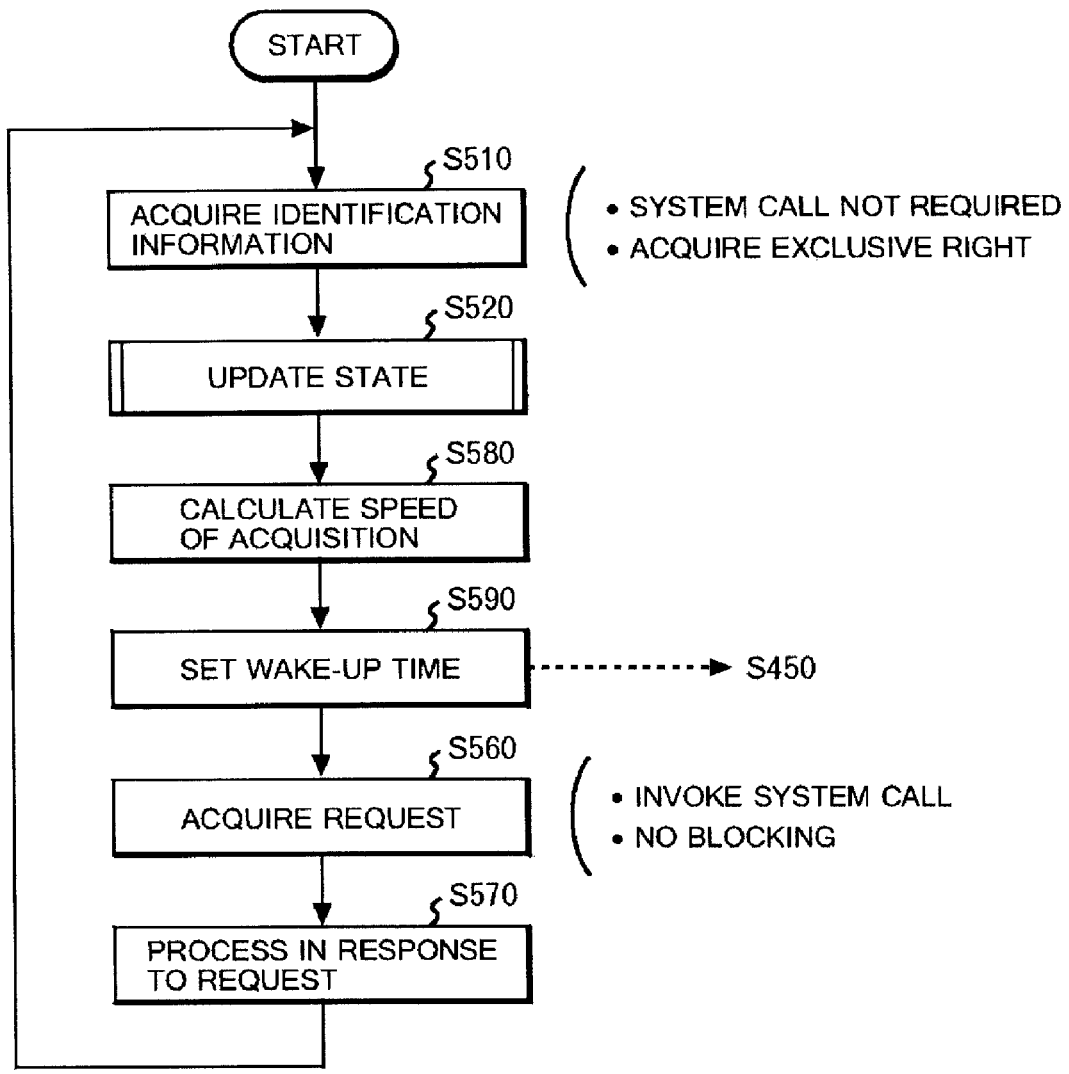
FIG. 8a is a flowchart showing an operation of a request processor 218-1 according to a second modification of the present embodiment.

FIG. 8a is a flowchart showing an operation of a request processor 218-1 in a second modification of the second Embodiment. In the second modification, the operation of the identification information storage unit 215 is the same as that described in reference to FIG. 4. S510 and S520 of FIG. 8A are also the same as S510 and S520, which were described in reference to FIG. 5. Hence, the request processor 218-1 attempts to acquire identification information from an identification information storage region 205B (S510). If the acquisition of identification information has failed, the request processor 218-1 stays on standby until a request waiting to be processed is newly received. Next, the request processor 218-1 updates a state stored in a state storage region 205C based on the number of the acquired identification information pieces (S520). Note that, in the second modification, the request processor 218-1 does not simply update the state stored in the state storage region 205C but stores a time of update in association with the updated state. In addition, the request processor 218-1 stores the state before the update and the previous update time as a history in the state storage region 205C.

Figure 8B:
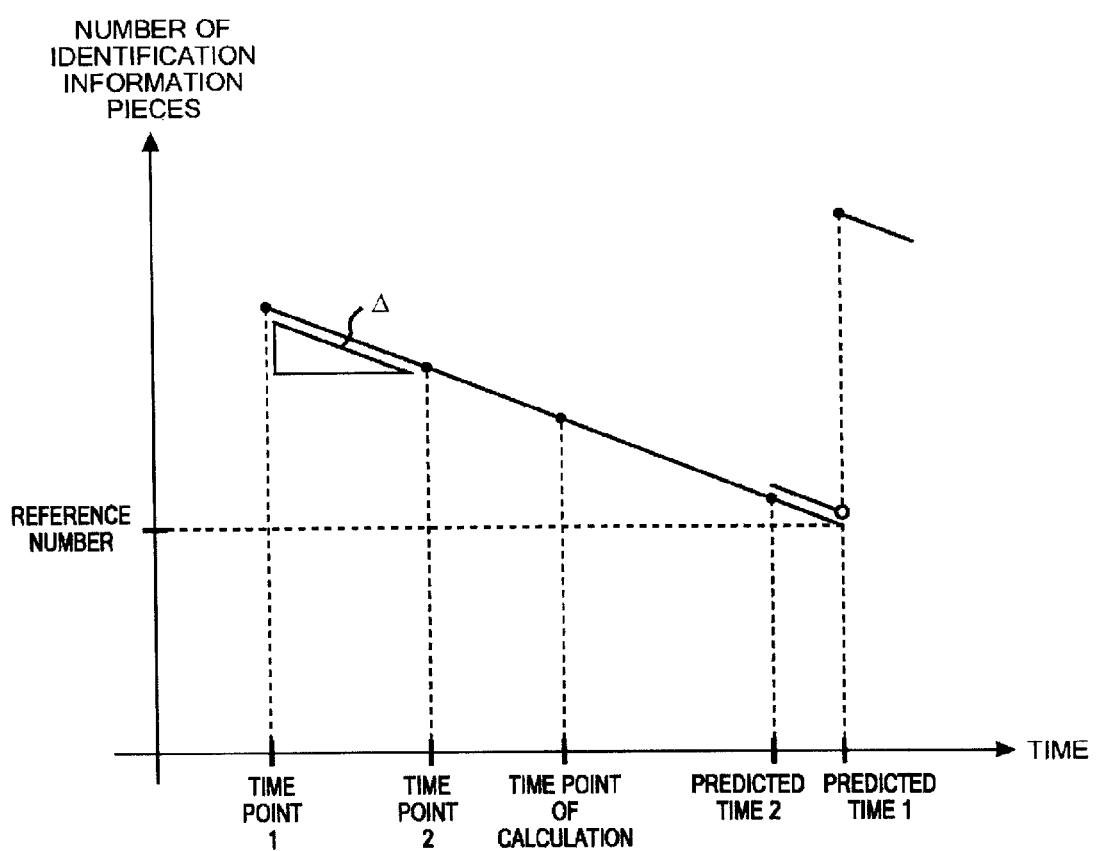
FIG. 8b is a flowchart showing the outline of processing to calculate an operation initiation time based on a speed of acquiring identification information according to the second modification of the present embodiment.

Then, the request processor 218-1 calculates the speed of the number of identification information pieces acquired from the identification information storage region 205B per unit of time based on the state and the history stored in the state storage region 205C (S580). A specific example of the calculation of a speed is shown in FIG. 8b. Based on the histories of the number of identification information pieces at time points 1 and 2, the request processor 218-1 calculates the speed of the number of identification information pieces acquired for the time period between these two time points. For example, a speed can be obtained by dividing the difference in the number of identification information pieces between these two time points by an elapsed time between these two time points. A calculated speed is expressed by an inclination A of a linear line showing a change in the number of identification information pieces between these two time points. Selection of these two time points used in combination for calculation of a speed is discretional. For example, the request processor 218-1 may calculate a speed based on the histories of the two closest time points. It is not necessary to perform calculation of a speed every time the request processor 218-1 acquires identification information Calculation may be performed at for a predetermined number of times.

The description goes back to FIG. 8a. Next, based on the calculated speed, the request processor 218-1 calculates a time at which the number of identification information pieces stored in the identification information storage region 205B is expected to decline to the reference number or below (hereinafter simply referred to as an estimated time) (S590). A calculation example of the estimated time is shown in FIG. 8b. The request processor 218-1 creates a linear function with the speed Δ as an inclination, which passes a coordinate point for the number of identification information pieces stored in the identification information storage region 205B at the time point for which an estimated time was calculated. Then, the request processor 218-1 obtains a point at which this linear function intersects with a constant function showing that the number of identification information pieces equals to the reference number, and calculates a coordinate value of the point on the time axis as an estimated time 1.

The request processor 218-1 may initiate an operation of the identification information storage unit 215 at the time of this estimated time 1. However, upon consideration that there is a lag time between the time points when the identification information storage unit 215 initiates an operation and when identification information is actually stored in the identification information storage region 205B, the request processor 218-1 may initiate the operation of the identification information storage unit 215 earlier. For example, the request processor 218-1 may calculate an estimated time 2 by subtracting the predetermined time elapsed, the time elapsed after the identification information storage unit 215 initiates an operation until identification information is actually stored in the identification information storage region 205B, from the estimated time 1.

The description goes back to FIG. 8a. Next, the request processor 218-1 implements a setting for initiating the operation of the identification information storage unit 215 at an estimated time (preferably the estimated time 1, but the estimated time 2 is also acceptable) calculated as above (S590). This may be achieved by creating an alarm thread which initiates the operation at a preset predetermined time. Upon initiating an operation, this alarm thread immediately instructs the identification information storage unit 215 to initiate the operation and terminates the processing. With this, the identification information storage unit 215 can be operated at the estimated time. If the alarm thread has been already created, in order to avoid giving redundant instructions to initiate an operation to the identification information storage unit 215, it is not necessary for the request processor 218-1 to perform the calculation processing of a speed described above. Since the following processing at S560 and S570 is the same as those described above in reference to FIG. 5, the explanation thereof will be omitted.

As described above, according to the second modification, once the speed of the identification information declining to the reference number or below is estimated, it is possible to omit the processing that determines whether or not to instruct the identification information storage unit 215 to initiate an operation. Thus, it is possible to increase the processing efficiency of the request processor 218-1. In addition, since the prediction is based on the number of identification information pieces which have been actually observed, the operation frequency of the identity information storage unit 215 can be flexibly adjusted depending on the operation state of the server device 20.

Figure 9:
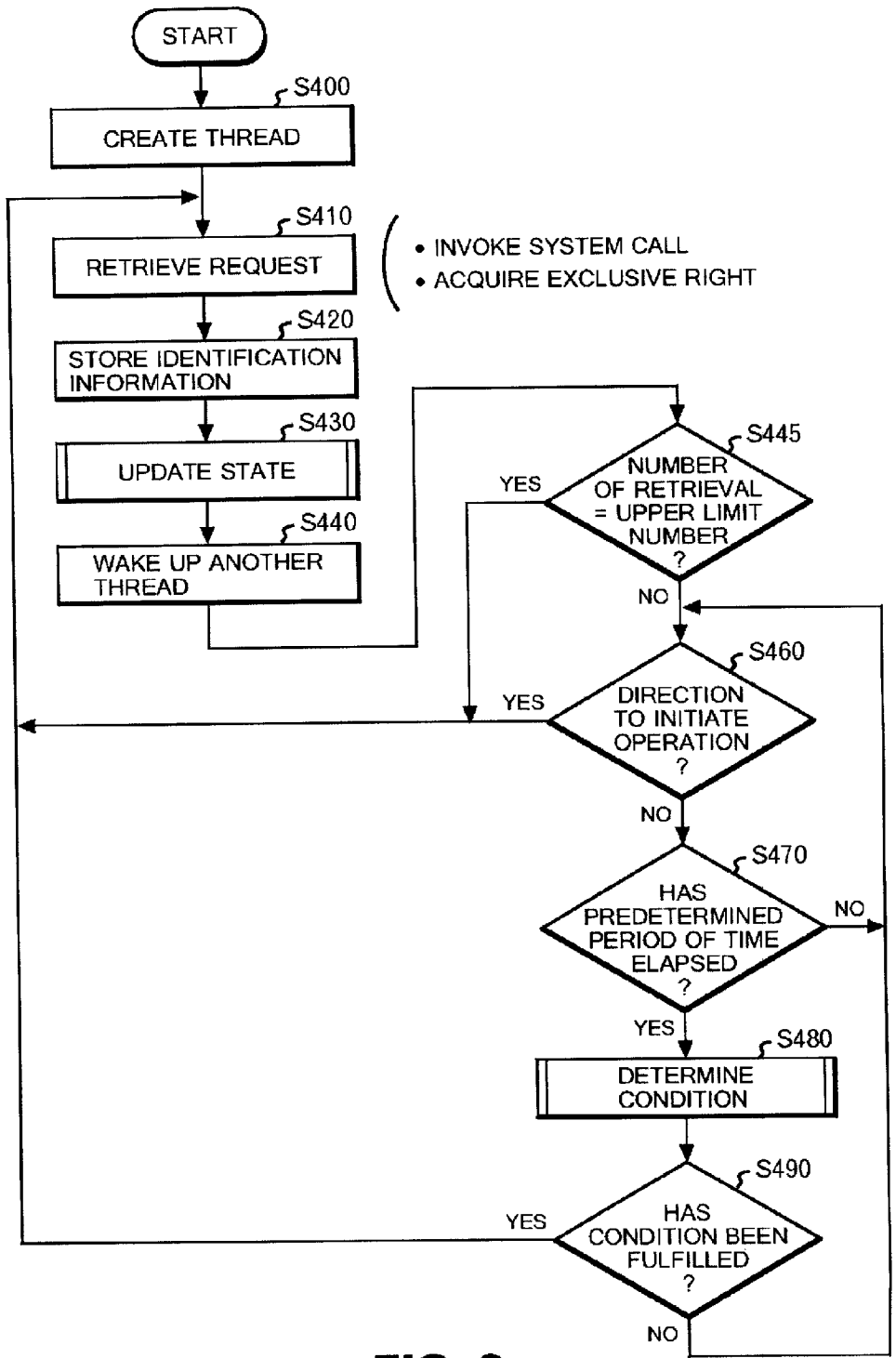
FIG. 9 is a flowchart showing an operation of an identification information storage unit 215 according to a third modification of the present embodiment.

FIG. 9 is a flowchart showing an operation of an identification information storage unit 215 according to a third modification of the second Embodiment. In this third modification, an operation of a request processor 218-1 is the same as that described in reference to FIG. 5 and the modification thereof. Thus, the explanation thereof will be omitted. Operations of the identification information storage unit 215 are also the same as those from S400 to S445 described above in reference to FIG. 4. That is, the identification information storage unit 215 retrieves an already-received request from the request storage region 205A, stores identification information of the retrieved request in the identification information storage region 205B, and, at the same time, updates the state of the state storage region 205C. Then, the identification information storage unit 215 determines whether or not the number of retrieved requests is equal to the upper limit number of requests to be retrieved (S445).

The processing which will be described below differs from that described in reference to FIG. 5. If the number of the retrieved identification information pieces is below the upper limit number (S445: NO), the identification information storage unit 215 determines whether or not an instruction to initiate an operation has been received from another worker thread, which is, in this case, any one of the request processors 218-1 to 218-n (S460). If an instruction to initiate an operation is received (S460: YES), the identification information storage unit 215 goes back to S410, and retrieves the next request. If it is not received (S460: NO), the identification information storage unit 215 determines whether or not a predetermined time has elapsed since the previous operation was initiated (S470). If the predetermined time has elapsed (S470: YES), the identification information storage unit 215 initiates the operation, and determines whether or not the predetermined condition has been fulfilled (S480). It is preferable that the determination whether or not the predetermined time has elapsed be performed by a timer function that is provided in advance by the operating system or the like. If the condition has been fulfilled, the identification information storage unit 215 goes back to S410 (S490) and retrieves the next request.

This determination of the condition shown as S480 is the same as that made by the request processor 218-1, which is described as S530. In other words, in the third modification, not only the request processor 218-1 but also the identification information storage unit 215 performs the determination of the condition. Specifically, for example, the identification information storage unit 215 initiates the operation every time a predetermined time period has elapsed and determines whether or not the number of identification information pieces stored in the identification information storage region 205B has declined to the reference number or below. Then, on condition that the number has declined to the reference number or below, the identification information storage unit 215 retrieves at least one request waiting to be processed from the request storage region 205A. By doing so, the frequency of determination can be increased, and therefore the identification information storage region 205B can be easily filled with identification information.

Alternatively, in the third modification of the second Embodiment, it is also possible that the request processor 218-1 does not determine the condition but that only the identification information storage unit 215 makes the determination as shown in FIG. 9. With this process, the identification information storage unit 215 can increase a time period originally spent for processing in response to a request.

Figure 10:
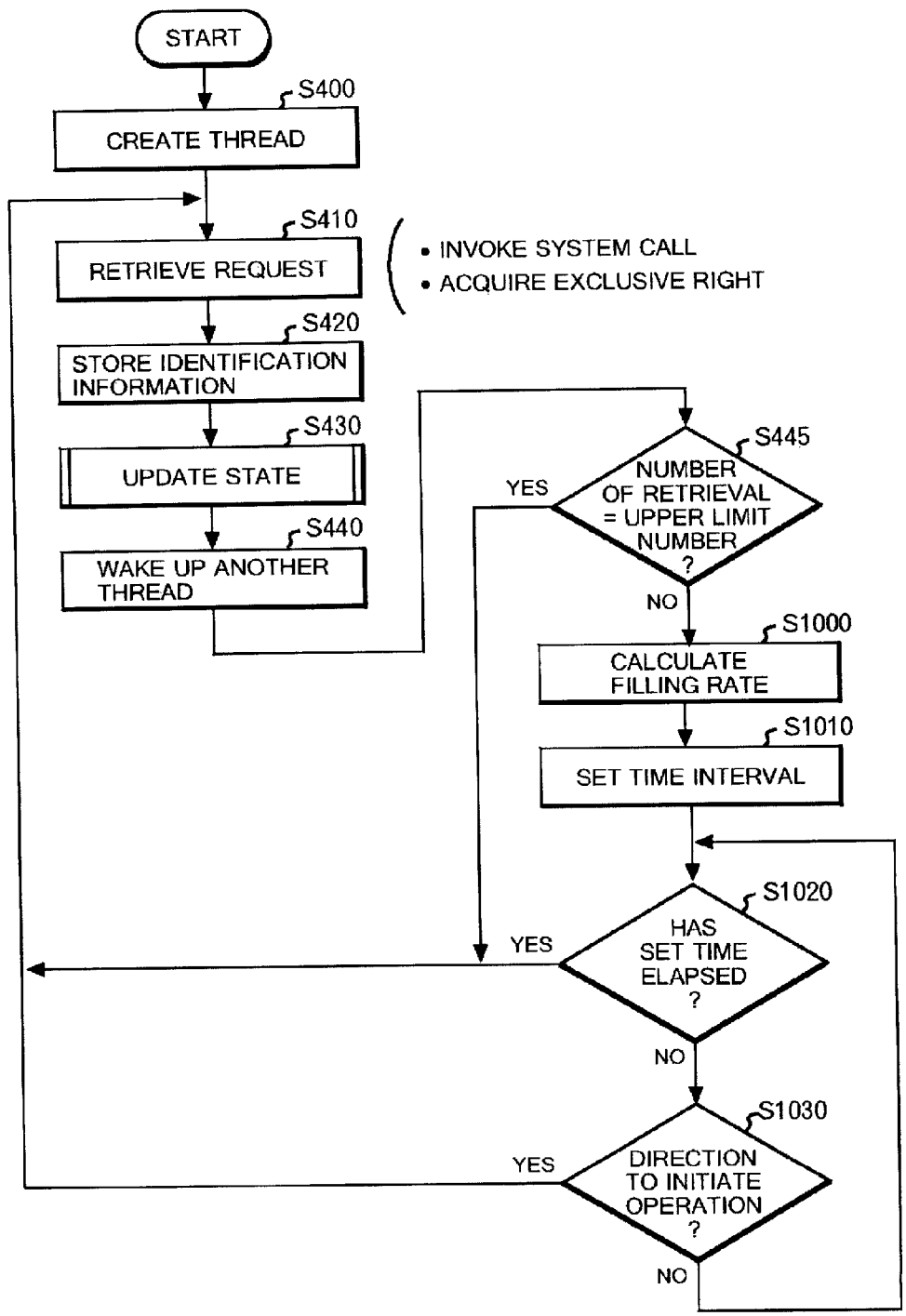
FIG. 10 is a flowchart showing an operation of an identification information storage unit 215 according to a fourth modification of the present embodiment.

FIG. 10 is a flowchart showing an operation of an identification information storage unit 215 according to a fourth modification of the present embodiment. In this fourth modification, the operation of a request processor 218-1 is the same as that described in FIG. 5 and the modification thereof, thus the explanation thereof will be omitted. Operations of an identification information storage unit 215 are also the same as those from S400 to S445 described above in reference to FIG. 4. That is, the identification information storage unit 215 retrieves an already-received request from a request storage region 205A, stores identification information of the retrieved request in the identification information storage region 205B, and, at the same time, updates the state of the state storage region 205C. Then, the identification information storage unit 215 determines whether or not the number of retrieved requests is equal to the upper limit number of requests to be retrieved (S445).

The processing which will be described below differs from that described in reference to FIG. 5. If the number of retrieved identification information pieces is below the upper limit number (S445: NO), the identification information storage unit 215 calculates an information filling rate which is a percentage of the number of identification information pieces to be retrieved in a single operation to the upper limit number (S1000). The information filling rate may be calculated based on a mean of the numbers of identification information pieces retrieved in a predetermined number, which is 2 or larger, of operations. For example, when updating state information at S430, the identification information storage unit 215 stores in the state storage region 205C a history of the number of identification information pieces retrieved at predetermined numbers, which are counted from the most recent, of the retrieving operations. After that, in the processing of calculating the identification filling rate at S1000, the identification information storage unit 215 calculates a mean value of the numbers of identification information pieces retrieved in a single operation based on the history of the number of the identification information pieces, divides the mean value by the upper limit number, and obtains the information filling rate.

Next, the identification information storage unit 215 calculates and sets a time interval for the operation of the identification information storage unit 215 based on this information filling rate (S1010). For example, on condition that the information filling rate is high, the identification information storage unit 215 sets the time interval shorter than that when the information filling rate is lower. If the information filling rate is high, there is a high possibility that a request waiting to be processed still remains in the request storage region 205A. Thus, even when the next operation is immediately initiated, there is a high possibility that a number of identification information pieces can be retrieved.

Next, the identification information storage unit 215 determines whether or not the set time interval has elapsed (S1020). If it has past (S1020: YES), the identification information storage unit 215 goes back to S400 and moves onto to the next retrieval. If it has not elapsed yet (S1020: NO), the identification information storage unit 215 determines whether or not an instruction to initiate an operation is received from another worker thread, which is in this case, from any one of the request processors 218-1 and 218-$n$ (S1030). If an instruction to initiate an operation has been received (S1030: YES), the identification information storage unit 215 goes back to S410 and retrieves the next request. If it is not received (S1030: NO), the identification information storage unit 215 goes back to S1020 and determines whether or not the set time has elapsed.

As described above, according to the fourth modification, the identification information storage unit 215 predicts a current state and a state in the near future of the request storage region 205A based on the information filling rate. If the identification information storage unit 215 predicts that the number of identification information pieces it can retrieve in a single operation is large, it operates more frequently. In this process, it is possible to adjust the frequency of request retrieval based on states of not only the identification information storage region 205B but also of the request storage region 205A, and therefore increase operation efficiency of the identification information storage unit 215. As a further modification based on the fourth modification, if the operation frequency is changed more frequently in response to an operation state of a web site, the operation frequency of the identification information storage unit 215 can be adjusted, and therefore the performance can be further improved. For example, depending on the total number of requests that the server device 20 can receive simultaneously or types of system software operating the server device 20, a time required by a single system call issued by the identification information storage unit 215, that is a time required for retrieving identification information of a request from the request storage region 205A, may vary.

If the time required for invoking the system call is extremely short, the possibility of deteriorating the performance by invoking a system call at a high frequency is low even if the information filling rate is low. In contrast, if the time required for invoking the system call is long, it is preferable that a system call be invoked at a low frequency, only if the information filling rate is high. Based on these observations, when the required time is shorter, the identification information storage unit 215 sets a time interval shorter than that when the required time is longer. This setting may be performed by the identification information storage unit 215 in advance at the initiation or reset time of the server device 20, or the setting may be changed during the operation accordingly.

As described above, in the fourth modification, by making the operation of the identification information storage unit 215 adjustable in terms of an information filling rate, it becomes possible to flexibly correspond with various environments in a web site management, and therefore increase operation efficiency of the server device 20.

Figure 11:
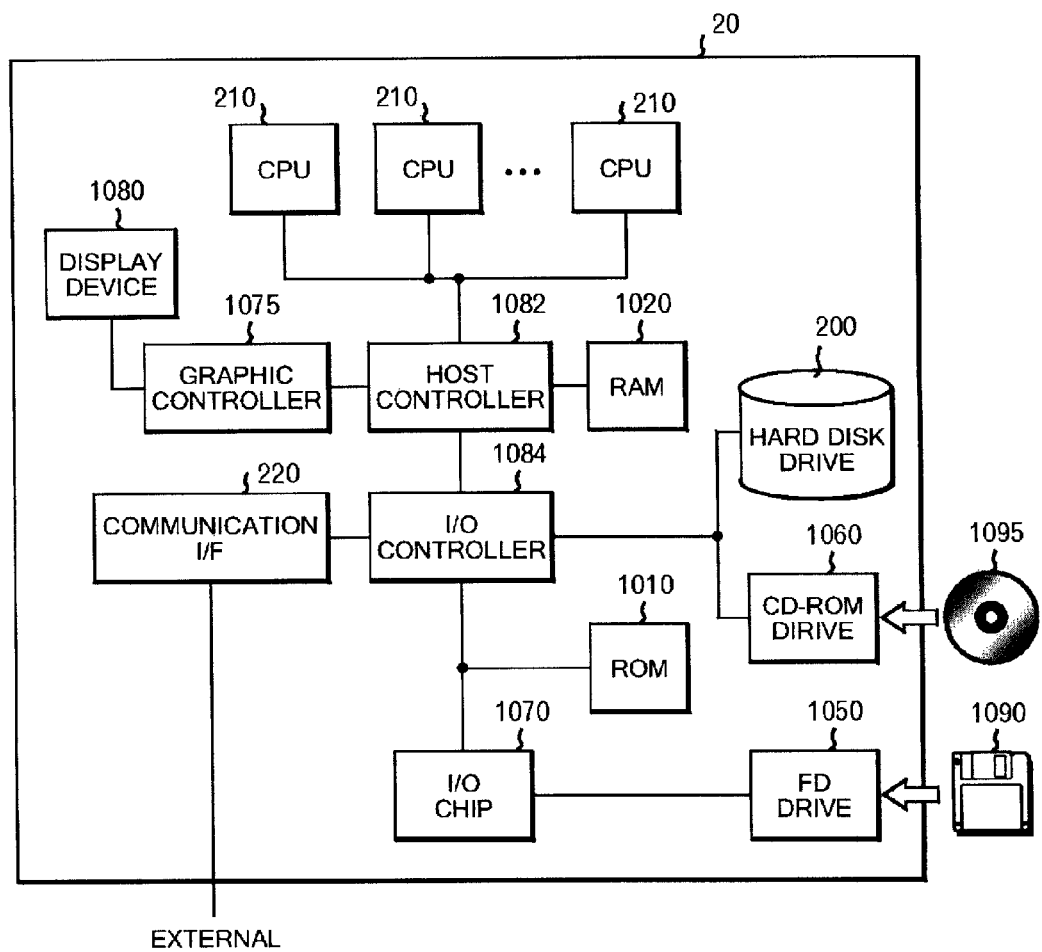
FIG. 11 shows an example of a hardware configuration of a computer functioning as a server device 20 according to the present embodiment.

FIG. 11 shows an example of the configuration of computer hardware which functions as the server device 20 according to the present embodiment. The server device 20 is provided with at least one CPU 210 which is interconnected by a host controller 1082, and CPU peripherals including RAM 1020 and a graphic controller 1075. In FIG. 11, the server device 20 adopts an SMP (Symmetric Multiple Processor)-type architecture. In the architecture, the CPUs 210 are symmetrically arranged with RAM 1020 at the center, and each CPU 210 has access upon sharing the RAM 1020. In addition, the server 20 is provided with an input/output unit having a communication interface 220, a storage device (for example, a hard disk drive) 200, a CD-ROM drive 1060, which are connected to the host controller 1082 by an input/output controller 1084, a legacy input/output unit having ROM 1010, a flexible disk drive 1050, and an input/output chip 1070, which are connected to the input/output controller 1084.

The host controller 1082 connects among the RAM 1020 the CPU 210, which makes access to the RAM 1020 at a high transferring rate, and a graphic controller 1075. The CPU 210 controls each unit by operating based on a program stored in the ROM 1010 and the RAM 1020. The graphic controller 1075 acquires image data that the CPU 210 or the like creates on a frame buffer provided in the RAM 1020, and displays the data on a display device 1080. Alternatively, the graphic controller 1075 may include the frame buffer which stores image data created by the CPU 210 or the like.

The input/output controller 1084 connects among the host controller 1082 the communication interface 220, which is a relatively high-speed input/output device, the storage device 200, and the CD-ROM drive 1060. The communication interface 220 communicates with external devices through a network. The storage device 200 stores programs and data which are used by the server device 20. The CD-ROM drive 1060 reads programs or data from the CD-ROM 1095 and provides them to the RAM 1020 or the storage device 200.

In addition, the ROM 1010 and relatively low-speed input/output devices, such as the flexible disk drive 1050 and the input/output chip 1070, are connected to the input/output controller 1084. The ROM 1010 stores a boot program, which is executed by the CPU 210 at the time when the server device 20 is initiated, and programs dependent on the hardware of the server device 20. The flexible disk drive 1050 reads programs or data from the flexible disk 1090 and provides them to the RAM 1020 or the storage device 200 through the input/output chip 1070. The input/output chip 1070 connects various kinds of input/output devices through the flexible disk 1090 and various ports, such as a parallel port, a serial port, a keyboard port, and a mouse port.

A program provided to the server device 20 is stored in a recording medium, such as a computer readable medium including a flexible disk 1090, a CD-ROM 1095, or an IC card, and provided by a user. The program is read from the recording medium through the input/output chip 1070 and/or the input/output controller 1084 installed in the server device 20 and then executed therein. Since operations that the program causes the server device 20 or the like to perform are the same as those performed in the server device 20 described above in reference to FIGS. 1 to 10, the description thereof will be omitted.

The program as described above may be stored in an external storage medium. In addition to the flexible disk 1090 and the CD-ROM 1095, the external storage medium may be an optical medium, such as DVD and PD, a magneto optical recording medium, such as MD, a tape medium, and a semiconductor memory, such as an IC card. It is also possible to use, in the place of a recording medium, a storage device, such as a hard disk or a RAM, equipped in the server system connected to a private communication network or the Internet, so that the program is provided to the server device 20 through the network.

As described above according to the present embodiment and various modifications, even if a number of requests are received in parallel simultaneously, by using the server device 20, these requests can be effectively allocated to each thread so that the processing can be performed effectively. The inventor of the present invention measured performances of the server device 20 upon causing it to serve as a web server, and it was observed that the processing efficiency of a benchmark program which virtually generates a web transaction was improved by as much as 6% (it is extremely difficult to improve performance even by only 1% with conventional improvement technology). It was also observed in a stress test that the performance was improved by 30%.

As described above, the present invention has been described by using the above-described embodiment. However, the technical scope of the present invention is not limited to the scope described in the above-described embodiment. It is obvious for those skilled in the art that various modifications or improvements can be added to the above-described embodiment. For example, it is possible that the request processors 218-1 to 218-$n$ and the identification information storage unit 215 are not operated by different threads each, and that one of the worker threads operating the request processors 218-1 to 218-$n$ also serves as a thread operating the identification information storage unit 215. In such a case, the request processor 218-1 may perform one set of the repeating processing shown in FIG. 4 in place of giving an instruction to initiate an operation shown at S550 in FIG. 5. It is obvious from the description of the scope of claims that the embodiment added with such modifications or improvement can also be included in the technical scope of the present invention.

The invention claimed is:

1. A server device which operates in response to a request received from a client device, the server device comprising:
a storage device having in system memory space a request storage region and, in user memory space, an identification information storage region;
an identification information storage unit for (i) retrieving at least one request waiting to be processed from the request storage region located within the system memory space wherein said at least one request is retrieved on condition that a number of identification information pieces stored in the identification information storage region has declined to a predetermined reference number or below, and (ii) storing identification information of the retrieved request in the identification information storage region located within the user memory space wherein the identification information identifies a connection to receive the retrieved request;
a plurality of request processors operating in parallel for acquiring from the request storage region the request identified by identification information on condition that the identification information has been successfully acquired from the identification information storage region; and
a state storage region in user memory space for storing a state of the identification information storage region based on at least one of the numbers of identification information pieces stored in the identification information storage region and of identification information pieces acquired from the identification information storage region, wherein;

upon newly storing identification information in the identification information storage region, the identification information storage unit updates the state stored in the state storage region according to the number of the identification information pieces newly stored, upon acquisition of the identification information from the identification information storage region, the request processor updates the state stored in the state storage region according to the number of the acquired identification information and determines, according to the updated state, whether or not the number of identification information pieces stored in the identification in formation storage region has declined to the reference number or below, and the condition that a number of identification information pieces stored in the identification information storage region has declined to a predetermined reference number or below is checked by at least one of the request processors by (i) counting the identification information storage region by scanning the number of identification information pieces or (ii) accessing the state storage region and referring to a counter which counts the number of identification information pieces in the identification information storage region.

2. The server device according to claim 1, wherein
the identification information storage unit and the plurality of request processors are respectively operated by a plurality of threads that are different from each other;
at least one of the request processors instructs the identification information storage unit to initiate an operation where the number of identification information pieces stored in the identification information storage region has declined to the reference number or below as a result of acquiring identification information from the identification information storage region; and
the identification information storage unit initiates an operation upon receiving the instruction from any one of the request processors, and retrieves at least one request waiting to be processed from the request storage region, and then stores identification information of the retrieved request in the identification information storage region.

3. The server device according to claim 1, wherein
upon acquisition of identification information from the identification information storage region, the request processor determines, according to the state stored in the state storage region, whether or not the number of identification information pieces acquired from the identification information storage region has reached the number of identification information pieces stored in the identification information storage region since the previous time when the identification information storage unit stored identification information in the identification information storage region.

4. The server device according to claim 1, wherein
the identification information storage unit retrieves at least one up to a predetermined number of requests from the request storage region in response to a single instruction to initiate an operation, and stores identification information of the retrieved requests in the identification information storage region; and
upon acquisition of identification information from the identification information storage region, the request processor determines, based on the state stored in the state storage region, whether or not the number of identification information pieces acquired from the identification information storage region has reached the upper limit number, which is the predetermined number since the previous time when the identification information storage unit stored identification information in the identification information storage region.

5. The server device according to claim 1, wherein
the state storage region stores the numbers of identification information pieces stored in the identification information storage region at two or more different time points; and
upon acquisition of identification information from the identification information storage region, the request processor calculates, based on the state stored in the state storage region, a speed of acquiring identification information pieces from the identification information storage unit per unit of time, as the number of the identification information pieces, calculates, based on the calculated speed, an estimated time when the number of identification information pieces stored in the identification information storage region has declined to the reference number or below, and then sets the identification information storage unit to initiate an operation at the estimated time.

6. The server device according to claim 1, wherein
the identification information storage unit further operates at intervals of a predetermined time period, retrieves at least one request up to a predetermined number of requests from the request storage region for a single operation, and then stores identification information of the retrieved request in the identification information storage region; and
on condition that an information filling rate, a percentage of the number of identification information pieces retrieved in a single operation relative to the upper limit number, which is the predetermined number, is higher, the identification information storage unit sets the time interval shorter than that when the information filling rate is lower.

7. The server device according to claim 6, wherein
a time required for retrieving identification information of a request from the request storage region is predetermined; and
when the required time is shorter, the identification information storage unit sets the time interval shorter than that when the required time is longer.

8. The server device according to claim 2, wherein
the identification information storage unit initiates an operation after every predetermined period of time, and determines whether or not the number of identification information pieces stored in the identification information storage region has declined to a predetermined reference number or below; and
on condition that the number has declined, the identification information storage unit retrieves at least one request waiting to be processed, and stores identification information of the retrieved request in the identification information storage region.

9. The server device according to claim 1, wherein
the identification information storage unit issues a system call to retrieve a request from the request storage region; and
each of the request processors attempts to acquire identification information from the identification information storage region without issuing a system call, and then acquires a request from the request storage region by issuing a system call on condition that the identification information has been acquired.

10. The server device according to claim 1, wherein
the identification information storage unit acquires an exclusive right for access to the request storage region and thereafter retrieves a request from the request storage region;
each of the request processors attempts to acquire identification information from the identification information storage region without acquiring an exclusive right for access to the request storage region; and
on condition that the identification information has been acquired, each of the request processors acquires an exclusive right for access to a region inside the request storage region storing a request identified by the acquired identification information, and obtains the request from the request storage region.

11. A method for causing a server device to perform processing in response to a request received from a client device, the method comprising the steps of:
retrieving, by an identification information storage unit of the server, at least one request waiting to be processed from a request storage region within a system memory space on condition that the number of identification information pieces stored in the identification information storage region has declined to a predetermined reference number or below;
storing identification information of the retrieved request in the an identification information storage region within a user memory space wherein the identification information identifies a connection to receive the retrieved request;
operating a plurality of request processors of the server device in parallel, to acquire from the request storage region the request identified by the identification information on condition that identification information has been acquired from the identification information storage region;
processing the required request; and
storing a state of the identification information storage region, in a state storage region in user memory space, based on at least one of the numbers of identification information pieces stored in the identification information storage region and of identification information pieces acquired from the identification information storage region, wherein
upon newly storing identification information in the identification information storage region, the identification information storage unit updates the state stored in the state storage region according to the number of the identification information pieces newly stored,
upon acquisition of identification information from the identification information storage region, the request processor updates the state stored in the state storage region according to the number of the acquired identification information and determines, according to the updated state, whether or not the number of identification information pieces stored in the identification information storage region has declined to the reference number or below, and
the condition that a number of identification information pieces stored in the identification information storage region has declined to a predetermined reference number or below is checked by at least one of the request processors by (i) counting the identification information storage region by scanning the number of identification information pieces or (ii) accessing the state storage region and referring to a counter which counts the number of identification information pieces in the identification information storage region.

12. The method according to claim 1, wherein
the identification information storage unit and the plurality of request processors are respectively operated by a plurality of threads that are different from each other;
at least one of the request processors instructs the identification information storage unit to initiate an operation where the number of identification information pieces stored in the identification information storage region has declined to the reference number or below as a result of acquiring identification information from the identification information storage region; and
the identification information storage unit initiates an operation upon receiving the instruction from any one of the request processors, and retrieves at least one request waiting to be processed from the request storage region, and then stores identification information of the retrieved request in the identification information storage region.

13. The method according to claim 11, wherein
upon acquisition of identification information from the identification information storage region, the request processor determines, according to the state stored in the state storage region, whether or not the number of identification information pieces acquired from the identification information storage region has reached the number of identification information pieces stored in the identification information storage region since the previous time when the identification information storage unit stored identification information in the identification information storage region.

14. The method according to claim 11, wherein
the identification information storage unit further operates at intervals of a predetermined time period, retrieves at least one request up to a predetermined number of requests from the request storage region for a single operation, and then stores identification information of the retrieved request in the identification information storage region; and
on condition that an information filling rate, a percentage of the number of identification information pieces retrieved in a single operation relative to the upper limit number, which is the predetermined number, is higher, the identification information storage unit sets the time interval shorter than that when the information filling rate is lower.

15. The method according to claim 12, wherein
the identification information storage unit initiates an operation after every predetermined period of time, and determines whether or not the number of identification information pieces stored in the identification information storage region has declined to a predetermined reference number or below; and
on condition that the number has declined, the identification information storage unit retrieves at least one request waiting to be processed, and stores identification information of the retrieved request in the identification information storage region.

16. The method according to claim 11, wherein
the identification information storage unit issues a system call to retrieve a request from the request storage region; and
each of the request processors attempts to acquire identification information from the identification information storage region without issuing a system call, and then acquires a request from the request storage region by issuing a system call on condition that the identification information has been acquired.

17. The method according to claim 11, wherein the identification information storage unit acquires an exclusive right for access to the request storage region and thereafter retrieves a request from the request storage region;

each of the request processors attempts to acquire identification information from the identification information storage region without acquiring an exclusive right for access to the request storage region; and on condition that the identification information has been acquired, each of the request processors acquires an exclusive right for access to a region inside the request storage region storing a request identified by the acquired identification information, and obtains the request from the request storage region.

18. A computer program product for causing a server device to perform processing in response to a request received from a client device, the computer program product comprising:

a non-transitory computer readable medium tangibly embodying program instructions having computer readable instructions which when implemented, cause a computer to carry out the steps of a method comprising;

retrieving at least one request waiting to be processed from the request storage region within a system memory space on condition that the number of identification information pieces stored in the identification information storage region has declined to a predetermined reference number or below;

storing identification information of the retrieved request in the identification information storage region within a user memory space wherein the identification information identifies a connection to receive the retrieved request;

operating a plurality of request processors of the server device in parallel, to acquire from the request storage region the request identified by the identification information on condition that identification information has been acquired from the identification information storage region;

processing the acquired request, and storing a state of the identification information storage region, in a state storage region in user memory space, based on at least one of the numbers of identification information pieces stored in the identification information storage region and of identification information pieces acquired from the identification information storage region, wherein upon newly storing identification information in the identification information storage region, the identification information storage unit updates the state stored in the state storage region according to the number of the identification information pieces newly stored, upon acquisition of identification information from the identification information storage region, the request processor updates the state stored in the state storage region according to the number of the acquired identification information and determines, according to the updated state, whether or not the number of identification information pieces stored in the identification information storage region has declined to the reference number or below, and wherein the condition that the number of identification information pieces stored in the identification information storage region has declined to a predetermined reference number or below is checked by at least one of the request processors by (i) counting the identification information storage region by scanning the number of identification information pieces or (ii) accessing the state storage region and referring to a counter which counts the number of identification information pieces in the identification information storage region.

19. A method for causing a server device to perform processing in response to a request received from a client device, the method comprising the steps of:

retrieving, by an identification information storage unit of the server, at least one request waiting to be processed from a request storage region within a system memory space on condition that the number of identification information pieces stored in the identification information storage region has declined to a predetermined reference number or below;

storing identification information of the retrieved request in an identification information storage region within a user memory space wherein the identification information identifies a connection to receive the retrieved request;

updating a state stored in a state storage region wherein the state is based on the number of the identification information pieces stored in the identification information storage region; and operating a plurality of request processors of the server device in parallel, to acquire from the request storage region the request identified by the identification information on condition that identification information has been acquired from the identification information storage region, and storing a state of the identification information storage region, in a state storage region in user memory space, based on at least one of the numbers of identification information pieces stored in the identification information storage region and of identification information pieces acquired from the identification information storage region, wherein upon newly storing identification information in the identification information storage region the identification information storage unit updates the state stored in the state storage region according to the number of the identification information pieces newly stored, upon acquisition of identification information from the identification information storage region, the request processor updates the state stored in the state storage region according to the number of the acquired identification information and determines accordion to the updated state, whether or not the number of identification information pieces stored in the identification information storage region has declined to the reference number or below, and wherein the condition that the number of identification information pieces stored in the identification information storage region has declined to a predetermined reference number or below is checked by at least one of the request processors by (i) counting the identification information storage region by scanning the number of identification information pieces or (ii) accessing the state storage region and referring to a counter which counts the number of identification information pieces in the identification information storage region.

20. A method for causing a server device to perform processing in response to a request received from a client device, the method comprising the steps of:

retrieving, by an identification information storage unit of the server, at least one request waiting to be processed from a request storage region within a system memory space on condition that the number of identification information pieces stored in the identification information storage region has declined to a predetermined reference number or below;

storing identification information of the retrieved request in an identification information storage region within a user memory space wherein the identification information identifies a connection to receive the retrieved request; and operating a plurality of request processors of the server device in parallel, to acquire from the request storage region the request identified by the identification information on condition that identification information has been acquired from the identification information storage region, and storing a state of the identification information storage region, in a state storage region in user memory space, based on at least one of the numbers of identification information pieces stored in the identification information storage region and of identification information pieces acquired from the identification information storage region, wherein upon newly storing identification information in the identification information storage region, the identification information storage unit updates the state stored in the state storage region according to the number of the identification information pieces newly stored, upon acquisition of identification information from the identification information storage region, the request processor updates the state stored in the state storage region according to the number of the acquired identification information and determines, according to the updated state, whether or not the number of identification information pieces stored in the identification information storage region has declined to the reference number or below, and wherein;

said retrieving step occurs on a predetermined time, and the condition that the number of identification information pieces stored in the identification information storage region had declined to a predetermined reference number or below is checked by at least one of the request processors by (i) counting the identification information storage region by scanning the number of identification information pieces or (ii) accessing the state storage region and referring to a counter which counts the number of identification information pieces in the identification information storage region.

* * * * *